United States Patent
D'Halluin et al.

(10) Patent No.: US 11,055,266 B2
(45) Date of Patent: Jul. 6, 2021

(54) EFFICIENT KEY DATA STORE ENTRY TRAVERSAL AND RESULT GENERATION

(71) Applicant: Western Digital Technologies, Inc., San Jose, CA (US)

(72) Inventors: Carl Rene D'Halluin, Zwijnaarde (BE); Bastiaan Stougie, Havant (BE); Koen De Keyser, Sint-Denijs-Westrem (BE); Thomas Demoor, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 203 days.

(21) Appl. No.: 16/009,933

(22) Filed: Jun. 15, 2018

(65) Prior Publication Data

US 2019/0057120 A1    Feb. 21, 2019

Related U.S. Application Data

(60) Provisional application No. 62/548,380, filed on Aug. 21, 2017.

(51) Int. Cl.
*G06F 16/22* (2019.01)
*G06F 16/2453* (2019.01)

(52) U.S. Cl.
CPC ...... *G06F 16/2228* (2019.01); *G06F 16/2246* (2019.01); *G06F 16/2453* (2019.01)

(58) Field of Classification Search
CPC .......... G06F 17/30321; G06F 16/2228; G06F 16/2246; G06F 16/2453; G06F 17/30442
See application file for complete search history.

(56) References Cited

U.S. PATENT DOCUMENTS

| | | | |
|---|---|---|---|
| 5,280,612 A | 1/1994 | Lorie et al. | |
| 5,682,537 A * | 10/1997 | Davies | G06F 9/52 710/200 |

(Continued)

FOREIGN PATENT DOCUMENTS

| | | |
|---|---|---|
| CN | 105740447 A | 7/2016 |
| IN | 2015KO00101 A | 12/2015 |

(Continued)

OTHER PUBLICATIONS

Kaur et al., "Concurrency Control in Distributed Database System," International Journal of Advanced Research in Computer Science and Software Engineering, vol. 3, Issue 7, Jul. 2013 (5 pages).

(Continued)

*Primary Examiner* — Apu M Mofiz
*Assistant Examiner* — Farhad Agharahimi
(74) *Attorney, Agent, or Firm* — Patent Law Works LLP

(57) ABSTRACT

In an example embodiment, a method comprises determining an ordered set of key entries; determining a first key entry for a first object in the ordered set of key entries; determining an object storage operation represented by a key of the first key entry; determining the object storage operation represented by the key of the first key entry to comprise a delete operation; and responsive to determining the object storage operation represented by the key of the first key entry to comprise the delete operation, skipping over subsequent key entries associated with the first object in the ordered set of key entries.

20 Claims, 9 Drawing Sheets

(56) References Cited

U.S. PATENT DOCUMENTS

| | | | |
|---|---|---|---|
| 5,806,074 | A | 9/1998 | Souder et al. |
| 5,937,414 | A | 8/1999 | Souder et al. |
| 5,974,425 | A | 10/1999 | Obermarck et al. |
| 6,434,575 | B1 | 8/2002 | Berry et al. |
| 6,496,830 | B1 | 12/2002 | Jenkins, Jr. |
| 6,606,626 | B1* | 8/2003 | Ponnekanti ......... G06F 16/2308 |
| 7,962,458 | B2 | 6/2011 | Holenstein et al. |
| 9,043,280 | B1 | 5/2015 | Patwardhan |
| 9,165,002 | B1 | 10/2015 | Lazier |
| 9,171,044 | B2 | 10/2015 | Schleimer et al. |
| 9,223,877 | B1 | 12/2015 | Cao et al. |
| 9,317,576 | B2 | 4/2016 | Merriman et al. |
| 9,396,202 | B1 | 7/2016 | Drobychev et al. |
| 9,400,828 | B2 | 7/2016 | Kesselman et al. |
| 9,460,008 | B1 | 10/2016 | Leshinsky et al. |
| 10,409,692 | B1 | 9/2019 | Brenner et al. |
| 10,514,985 | B1 | 12/2019 | Patwardhan et al. |
| 2005/0223277 | A1 | 10/2005 | Ballard |
| 2009/0228443 | A1* | 9/2009 | Lapin ................. G06F 16/2465 |
| 2010/0094813 | A1 | 4/2010 | Brueggemann et al. |
| 2011/0302143 | A1 | 12/2011 | Lorcet |
| 2012/0254175 | A1 | 10/2012 | Horowitz et al. |
| 2013/0006993 | A1* | 1/2013 | Kobayashi .......... G06F 16/2365 |
| | | | 707/737 |
| 2013/0024722 | A1 | 1/2013 | Kotagiri et al. |
| 2013/0073532 | A1 | 3/2013 | Bachar et al. |
| 2013/0117272 | A1 | 5/2013 | Barga et al. |
| 2013/0117654 | A1* | 5/2013 | Rosner ................ G06F 16/2465 |
| | | | 715/227 |
| 2013/0297697 | A1 | 11/2013 | Haimovitch et al. |
| 2013/0311422 | A1 | 11/2013 | Walker et al. |
| 2014/0006458 | A1 | 1/2014 | Hsieh et al. |
| 2014/0149353 | A1* | 5/2014 | Lee ...................... G06F 16/174 |
| | | | 707/639 |
| 2015/0067088 | A1 | 3/2015 | Guerin et al. |
| 2015/0081810 | A1 | 3/2015 | Christianto et al. |
| 2015/0172412 | A1 | 6/2015 | Escriva et al. |
| 2015/0213109 | A1 | 7/2015 | Kassko et al. |
| 2015/0317349 | A1 | 11/2015 | Chao et al. |
| 2016/0110109 | A1 | 4/2016 | Cowling et al. |
| 2016/0147811 | A1 | 5/2016 | Eluri et al. |
| 2016/0179850 | A1 | 6/2016 | Martin et al. |
| 2016/0210228 | A1 | 7/2016 | Tandel |
| 2017/0132429 | A1 | 5/2017 | Bell et al. |
| 2017/0185625 | A1* | 6/2017 | Cheru .................. G06F 16/217 |
| 2017/0193031 | A1 | 7/2017 | Papapanagiotou et al. |
| 2017/0206231 | A1 | 7/2017 | Binder et al. |
| 2017/0220617 | A1* | 8/2017 | Bortnikov ........... G06F 16/2329 |
| 2017/0371912 | A1* | 12/2017 | Kimura ................ G06F 3/0685 |
| 2018/0218022 | A1* | 8/2018 | Mace .................. G06F 16/2343 |
| 2018/0225051 | A1 | 8/2018 | Vansa |
| 2018/0276223 | A1 | 9/2018 | Dhanasekaran et al. |
| 2019/0050429 | A1 | 2/2019 | Parayatham et al. |

FOREIGN PATENT DOCUMENTS

| | | |
|---|---|---|
| WO | 2013019888 A1 | 2/2013 |
| WO | 2014008495 A2 | 1/2014 |

OTHER PUBLICATIONS

Tracy, "Serializable, Lockless, Distributed: Isolation in CockroachDB," May 4, 2016 (10 pages).

Hoffer, Jeffrey A. et al, Modern Database Management, Advanced Database Topics, Part V, Chapter 12, "Distributed Databases," 2013, 28 pages <http://wps.pearsoned.co.uk/wps/media/objects/10977/11240737/Web%20chapters/Chapter%2012_WEB.pdf>.

Krzyzanowski, Paul et al., "Distributed Systems 20. Spanner," Nov. 21, 2016, 14 pages <https://www.cs.rutgers.edu/~pxk/417/notes/content/20-spanner-slides.pdf>.

Murat, "Spanner: Google's Globally-Distributed Database" Jul. 4, 2013, 5 pages <http://muratbuffalo.blogspot.in/2013/07/spanner-googles-globally-distributed_4.html>.

Rystsov, Denis, "Visualization of serializable cross shard client-side transactions," Mar. 2, 2016, 5 pages <http://rystsov.info/2016/03/02/cross-shard-txs.html>.

International Search Report and Written Opinion, PCT/US2018/035921, dated Aug. 27, 2018, p. 1-14.

Dragojevic, A., et al., FaRM: Fast Remote Memory, Paper of the Proceedings of the 11th USENIX Symposium on Networked Systems Design and Implementation, Apr. 2-4, 2014, p. 400-414, Seattle, WA, https://www.usenix.org/conference/nsdi14/ technical-sessions/dragojevic.

Gao, et al., Application Specific Data Replication for Edge Services, Paper, May 20-24, 2003, p. 1-16, Budapest, Hungaryb http://www2003.org/cdrom/papers/refereed/p669/www03_xhtml/lead.html.

Goel, S. et al., Data Replication Strategies in Wide Area Distributed Systems, Paper, 2006, p. 1-27, The University of Melbourne, Australia, http://www.cloudbus.org/papers/DataReplicationInDSChapter2006.pdf.

Haapasalo, T., et al, Concurrent Updating Transactions on Versioned Data, Paper, Sep. 16-18, 2009, p. 77-87, Finland.

Ho, Ricky, "Everything You Need to Know About Couchbase Architecture," Database Zone, Jul. 12, 2012, 23 pages.

Katsov, I., Distributed Algorithms in NoSQL Databases, Highly Scalable Blog, Date Accessed Oct. 12, 2016, p. 1-18, https://highlyscalable.wordpress.com/2012/09/18/distributed-algorithms-in-nosql-databases/.

Taherimonfared, A., et al., Real-Time Handling of Network monitoring Data Using a Data-Intensive Framework, Paper, 2013, p. 258-265, IEEE International Conference on Cloud Computing Technology and Science.

Wei, X., et al., Fast In-Memory Transaction Processing Using RDMA and HTM, Shanghai Jiao Tong University Paper, Oct. 4-7, 2015, p. Monterey, CA.

Amazon Simple Storage Service Developer Guide, API Version, Mar. 1, 2006, p. 1-6, http://docs.aws.amazon.com/AmazonS3/latest/dev/mpuoverview.html.

International Preliminary Report on Patentability, PCT/US2018/035921, dated Mar. 5, 2020 (8 pages).

* cited by examiner

EFFICIENT KEY DATA STORE ENTRY TRAVERSAL AND RESULT GENERATION

TECHNICAL FIELD

The present disclosure generally relates to data storage and retrieval. In a more particular non-limiting example, the present disclosure relates to efficient key data store entry traversal and result generation.

BACKGROUND

The rise in electronic and digital device technology has rapidly changed the way society communicates, interacts, and consumes goods and services. A variety of relatively inexpensive electronic devices are enabled by the advances in digital and electronic technology and can be used for a variety of purposes. Specifically, modern electronic devices, such as desktop computers, laptops, smart phones, and tablets, allow a user to have continuous access to a variety of useful applications. Using such applications results in the generation of an increasingly large amount of data. Storing and retrieving the produced data efficiently is a significant challenge.

Some solutions use a metadata database (DB) or a key value store (KVS) in a large-scale decision support system (DSS) to provide scalability in an attempt to accommodate the current growth in data. These types of distributed, large-scale DSSs generally require that high levels of consistency be maintained in the metadata DB or KVS with a minimal impact on the responsiveness, particularly when querying ordered subsets of the keys of the DB.

In some key value stores or other similar large-scale data storage systems, the system may store a key entry for each requested data storage operation (e.g., a separate entry for each change to a particular object). As such, a large number of key entries may accumulate for each data object. When a client requests an operation be performed on a particular user object, the storage system queries the database to identify the corresponding entry (key-value pair) so the requested operation may be performed (e.g., data may be written, object may be deleted, object may be retrieved and transmitted to the requesting client, etc.). However, due the number of entries that accumulate over time for the new and existing objects stored by the system, the computational overhead incurred to identify a particular entry or set of entries (e.g., outdated entries for a certain object) also increases, which causes significant scalability issues. Additionally, maintenance of the entries stored in the data stores has increasingly become difficult because outdated entries for numerous objects often need to be quickly found and garbage collected, which further contributes to the increased computational load that must be efficiently borne by the system.

SUMMARY

The present disclosure generally relates to novel storage technology that can efficiently skip entries and generate lists for various objects in a key data store.

According to one innovative aspect, a computer-implemented method comprises determining an ordered set of key entries; determining a first key entry for a first object in the ordered set of key entries; determining an object storage operation represented by a key of the first key entry; determining that the object storage operation represented by the key of the first key entry comprises a delete operation; and responsive to determining that the object storage operation represented by the key of the first key entry comprises the delete operation, skipping over subsequent key entries associated with the first object in the ordered set of key entries.

According to another innovative aspect, a computer-implemented method comprises determining an ordered set of key entries; determining a first key entry for a first object in the ordered set of key entries; determining an object storage operation represented by a key of the first key entry; determining that the object storage operation represented by the key of the first key entry comprises a delete operation; and responsive to determining the object storage operation represented by the key of the first key entry comprises the delete operation, including information associated with the first key entry in result set.

According to another innovative aspect, a storage system comprises one or more processors; a key data store comprising an ordered set of key entries; and a storage application executable by the one or more processors to perform operations. Each of the key entries of the ordered set is associated with a corresponding object storage operation. The operations performed by the storage application comprise determining a first key entry for a first object in the ordered set of key entries; determining an object storage operation represented by a key of the first key entry; determining that the object storage operation represented by the key of the first key entry comprises a delete operation; and responsive to determining that the object storage operation represented by the key of the first key entry comprises the delete operation, skipping over subsequent key entries associated with the first object in the ordered set of key entries.

According to another innovative aspect, a storage system comprises one or more processors; a key data store comprising an ordered set of key entries; and a storage application executable by the one or more processors to perform operations. Each of the key entries of the ordered set is associated with a corresponding object storage operation. The operations performed by the storage application comprise determining a first key entry for a first object in the ordered set of key entries; determining an object storage operation represented by a key of the first key entry; determining that the object storage operation represented by the key of the first key entry comprises a delete operation; and responsive to determining that the object storage operation represented by the key of the first key entry comprises the delete operation, including the key of the first key entry in a result set.

These and other implementations may optionally include one or more of the following features: determining a second key entry for a second object in the ordered set of key entries; determining an object storage operation represented by a key of the second key entry; determining that the object storage operation represented by the key of the second key entry comprises an operation other than the delete operation; responsive to determining that the object storage operation represented by the key of the second key entry comprises an operation other than the delete operation, listing the second object in a result set; responsive to determining that the object storage operation represented by the key of the second key entry comprises an operation other than the delete operation, skipping over subsequent key entries associated with the second object in the ordered set of key entries; storing a plurality of key entries in an ordered database of key entries at a server system; that each key entry of the plurality of key entries is associated with a corresponding object storage operation; that the ordered set of key entries comprises the ordered database or a set of results queried from the ordered database; that each key entry in the ordered set of key entries includes a corresponding operation type identifier; that the ordered set of key entries is ordered at least partially by recency; that the ordered set of key entries is ordered based on one or more of an object identifier, an inverse timestamp, and an operation type; that the ordered set of key entries is ordered alphanumerically; that each key entry in the ordered set of key entries has an associated key that includes an inverse timestamp; determining an ordered set of key entries; determining a first key entry for a first object in the ordered set of key entries; determining an object storage operation represented by a key of the first key entry; determining that the object storage operation represented by the key of the first key entry comprises a delete operation; responsive to determining the object storage operation represented by the key of the first key entry comprises the delete operation, including information associated with the first key entry in result set; including information associated with subsequent key entries associated with the first object in the result set; determining a second key entry for a second object in the ordered set of key entries; determining an object storage operation represented by a key of the second key entry; determining that the object storage operation represented by the key of the second key entry comprises an operation other than the delete operation; responsive to determining that the object storage operation represented by the key of the second key entry comprises an operation other than the delete operation, skipping the second key entry; including information associated with subsequent key entries associated with the second object in the result set; and garbage collecting, based on the result set, versions of the first object and versions of the second object.

Other aspects include corresponding methods, systems, apparatus, and computer program products for these and other innovative aspects.

It should be understood that the above list of features is not all-inclusive and many additional features and advantages, such as but not limited those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes a novel key ticketing technology, which may include methods, systems, apparatuses, computer program products, and other aspects, that utilizes a key data store (e.g., database, key-value store (KVS), etc.). The technology is advantageously scalable and does not require multi-key transactions in order to guarantee consistency.

As a non-limiting overview, the technology can store keys in the key data store in a novel, ordered way that improves responsiveness when processing operations (e.g., read requests). The key data store supports a plurality of storage operations, such as but not limited to, put, get, delete, list, etc., and stores entries representing various data manipulation operations performed on objects, such as standard data manipulation operations (e.g., read, write, delete, modify, etc.). In some embodiments, the key data store may be sharded or distributed.

Figure 1A:
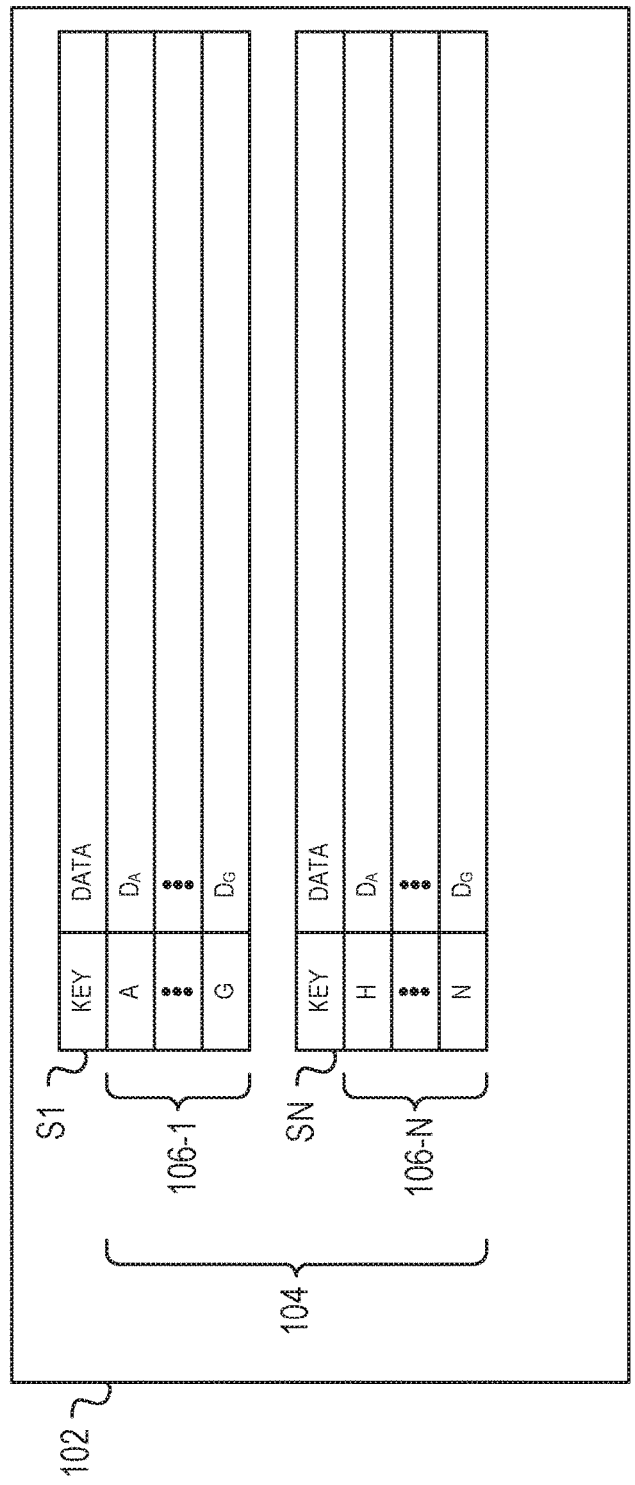
FIG. 1A is a diagram illustrating an example key data store.

FIG. 1A is a diagram illustrating an example key data store 102, which comprises a plurality of shards S1 . . . SN. While two shards S1 and SN are shown, it should be understood that any suitable number of shards may be included. Each shard stores an ordered subset of object key entries. For example, shard S1 is shown as storing the subset of object key entries 106-1 (e.g., keys A-G) and shard SN is shown as storing the subset of object key entries 106-N (e.g., keys H-N). The subsets 106-1 through 106-N comprise the ordered set of object key entries 104.

Further, as shown in FIG. 1A, each key (e.g., A . . . N, etc.) can correspond to a data instance (e.g., DA . . . DN). The data instance may comprise a pointer to a location where the actual object data is stored (e.g., in a separate database, on a physical drive, etc.), or other suitable data values. Each key corresponds to a particular object. Further, various subsets of object key entries may correspond to the same object at different points in time. In such a configuration, an ordered set of object key entries can be stored across shards that can be efficiently searched. Further, storage of the actual data may be performed in accordance with various considerations such as data location, availability, and cost.

Figure 1B:
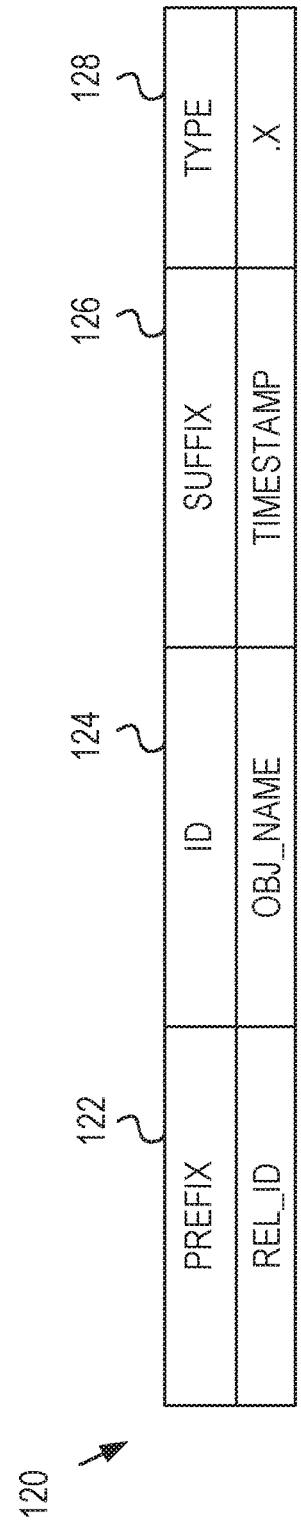
FIG. 1B is a diagram of an example key entry naming structure.

A key (also referred to as an object key) may be generated using an object key naming structure. FIG. 1B is a diagram of an example object key naming structure 120. As shown, a key may comprise a combination of a plurality of key components, such as, but not limited to, an object identifier and an inverse time value. More particularly, as shown, example components include a prefix 122, an object ID 124, a suffix 126, and a type 128, although it should be understood that other dimensions are possible and contemplated, and could vary based on implementation.

The prefix 122 may comprise an identifier for identifying a group of object key entries from the ordered set of object key entries that are logically related. For example, the prefix may include a domain identifier, a bucket identifier, a client identifier, or any suitable combination thereof. In this way, a given client's object keys can be grouped together. Any suitable number of prefixes may be included in an object key.

The object identifier (ID) 124 may comprise a unique identifier for the object to which the key corresponds, such as an object name. An example object identifier may comprise a unique character string (e.g., a file identifier, a file name, etc.) that is auto-generated and/or user-defined, and used for storing the object or file in an object storage, although other suitable data constructs that can uniquely identify objects are also encompassed.

The suffix 126 may comprise a ticket value for ordering different object keys associated with a particular object. The ticket value (also simply called ticket in some embodiments) may be an inverse timestamp. As discussed further herein, an inverse timestamp is calculated by determining the difference between an operation timestamp associated with the object key (e.g., local timestamp) and a reference timestamp value). As time passes, the value of the inverse timestamp generally decreases. As such, two sequential operations associated with the same object are recorded in the key data store in inverse order, with the most-recent operation being represented first (ahead of the less recent operation).

Additional suffix(es) may be appended, such as, but not limited to, an operation type, such as type 128. The type 128 may comprise an identifier of the type of object storage operation that is represented by the object key. In some embodiments, a given operation may be denoted by a corresponding value, such as, but not limited to, unique character or character string, and the type 128 may include that value. Example object storage operations include read, write, delete, update, etc. As a further example, write and update operations may be represented by a given identifier (e.g., "W"), a delete operation may be represented a given identifier (e.g., "K), etc., and so forth. While in some example embodiments, write and update operations may be recorded as the same type of operation, in further embodiments they may be differentiated.

In some example embodiments, a source identifier may comprise an identifier of a particular key data store or storage location in a distributed database system. In some embodiments, a given key data store location may be denoted by a corresponding value, such as, but not limited to, unique character or character string, and the source identifier may include that value. This source identifier may allow potential conflicts to be resolved for key entries received at different branch locations for the same object at the same time.

Figure 1C:
FIG. 1C is a diagram showing an example ordered set of key entries.

FIG. 1C is a diagram showing an example ordered set of object key entries 130. As shown, the set 130 includes two keys 132-1 and 132-2 representing two sequential write operations. In this example, key 132-1 includes an operation timestamp of 20 milliseconds (ms), the key 132-2 includes an operation timestamp of 10 ms, and the ticketing technology uses an example reference timestamp of 100 ms. It should be understood that the timestamp values used are provided by way of example to make the examples provided herein clear, and any suitable timestamps may apply, such as a POSIX timestamp, a 1900 date system timestamp, derivations there, and/or any other suitable convention for tracking time. Further, as a matter-of-course, the value of the reference timestamp is often chosen to have a value that is larger than the expected service life of the key data store.

Using the reference timestamp, the ticketing technology determines an inverse timestamp for each of the operations. As the operation timestamps increase with the passage of time, the computed inverse timestamps decrease for the operations executed over time. For instance, an inverse timestamp for a given operation is calculated by determining the difference between the operation timestamp and the reference timestamp). In particular, continuing the above example, for key 132-1, the inverse timestamp is 80 (100−20=80), and for write operation 132-N, the inverse timestamp is 90 (100−10=90).

By ordering the entries in the key data store (and the operations embodied thereby) relating to the same data object using at least the inverse timestamps, subsequent operations relating to that data object are arranged in entries in the ordered key data store with the most-recent operation being represented first. For instance, as shown in FIG. 1C, key 132-2, which represents an operation having an inverse timestamp of 90, is older than key 132-1, which represents a more recent operation having a timestamp of 80. As a result, an entry comprising key 132-1 is ordered ahead of an entry comprising key 132-2 in the ordered set 130 because key 132-1's inverse timestamp is lower (80 versus 90).

By way of further example, during a subsequent query, retrieval of the most-recent entry from the ordered set of object key entries (e.g., in this example, the entry comprising key 132-1) can be performed efficiently (e.g., by the key data store controller 320, see FIG. 3) because retrieval of the first entry in the ordered set for a given object (e.g., OBJ_NAME) does not require iteration through entries associated with that object. Rather, by way of illustration, such a retrieval may consume equivalent computational resources as that of an exact lookup of a single key for that object.

Versioning of an object includes the tracking and preservation of more than one version of the object as the object changes over time, and allows for the archival of the different versions of the object as they occur over time (e.g., due to modifications made over time to the object), retrieval of a prior version of the object, and/or recovery from unintended overwrites and/or deletions made to the object.

Advantageously, using the inverse timestamps as suffixes allows versioning of an object to be achieved in a scalable way without impacting performance of single key read operations, and without impacting the design or configurations of the key data store and/or its shards.

The ticketing technology can also provide for lock-free concurrency. As discussed further below, the ticketing technology may do so by including a suffix in the key that identifies the particular client making the object storage request. The key's client identifier advantageously allows the ticketing technology to handle concurrent object storage requests of different clients, which are issued at exactly the same time, without having to revert to performance reducing lock mechanisms.

Figure 2:
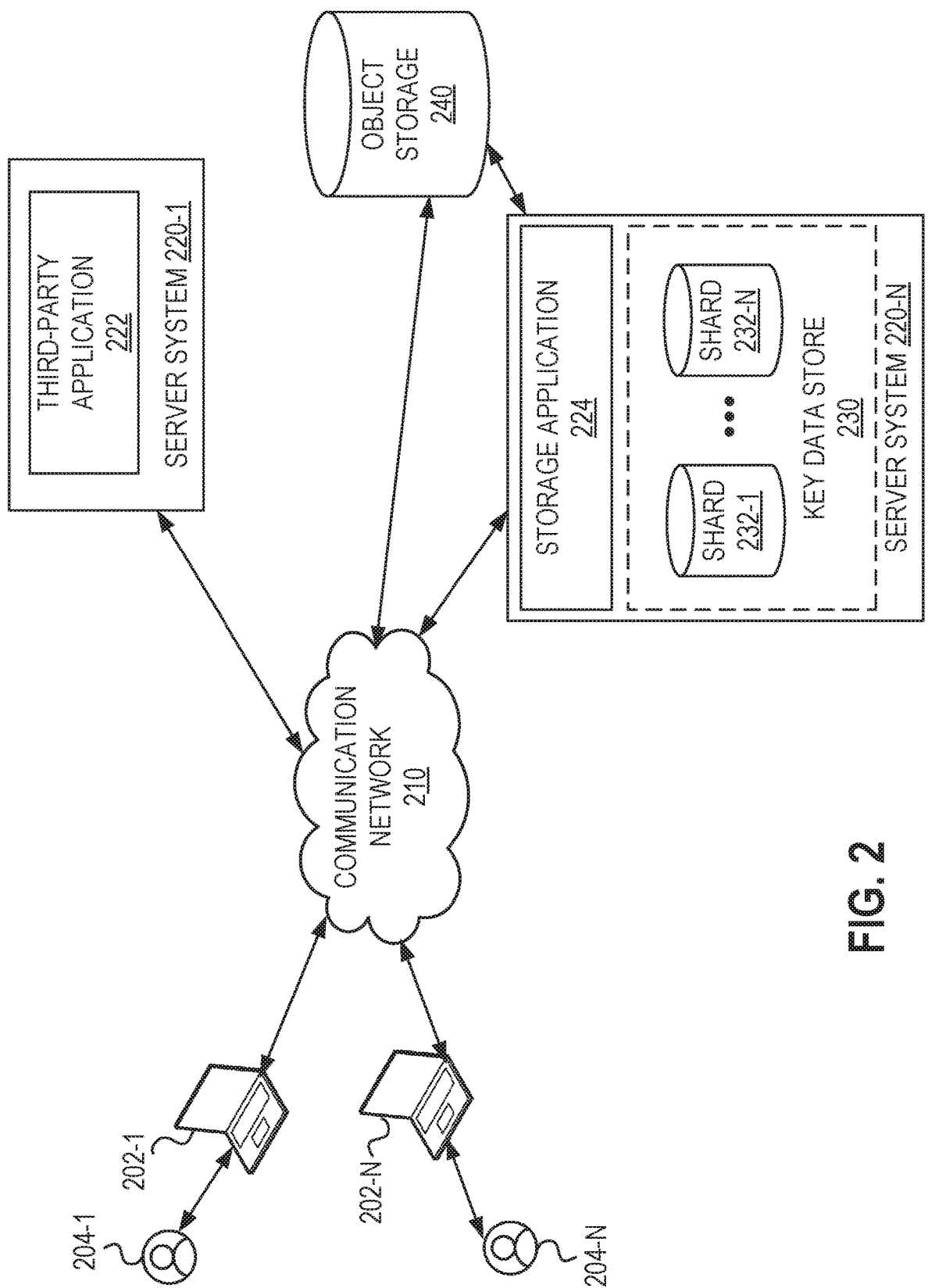
FIG. 2 is a block diagram of an example key ticketing system.

The key data store may be implemented a distributed environment, such as the client-server key ticketing system 200 depicted in FIG. 2. As shown, the system 200 can include client systems (e.g., client systems 202-1 and 202-N), server systems (e.g., server systems 220-1 and 220-N), a key data store 230, and an object storage 240. These components 202, 220, 230, and/or 240 may be interconnected via a communication network 210. For simplicity in some cases, depending on context, the client systems 202-1 and 202-N may also be referred to herein individually or collectively as client system 202 or client 202, and the server systems 220-1 and 220-N may be referred to herein individually or collectively as server system 220 or server 220.

The communication network 210 may include any number of private and public computer networks. The communication network 210 include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via the network 210 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols.

A client system may comprise an electronic computing device, such as a personal computer (PC), a laptop, a smartphone, a tablet, a mobile phone, a wearable electronic device, server, server appliance, or any other electronic device or computing system capable of communication with the communication network 210. The client system 202 may store one or more client applications in non-transitory memory. A client application may be executable by a computer processor of the client system 202. In some example embodiments, a client application includes one or more applications such as, but not limited to, data storage applications, search applications, communication applications, productivity applications, game applications, word processing applications, or any other useful applications. A client application may include a web browser and/or code executable thereby in some cases. In some embodiments, a client system 202 may include an application for creating, modifying, and deleting objects, which may be stored in the object storage 240. For instance, the application may be specifically customized for communication with the third-party application 222 and/or storage application 224, such as an application adapted to configure and/or utilize programming interfaces of the storage application 224. In some embodiments, the third-party application(s) 222 hosted by the server system 220-1 may embody a client of the storage application 224, as it may access the functions of the storage application 224 using various programmatic interfaces surfaced thereby (e.g., to create, store, retrieve, delete, etc., objects stored in the object storage).

The client systems 202 and/or server systems 220 may send/receive requests and/or send/receive responses, such as but not limited to HTTP(S) requests/responses, to/from one another. A client system 202 may present information, such as visual, audio, tactile, and/or other information via output devices, such as displays, audio reproduction devices, vibration mechanism, etc., based on information generated by client system 202 and/or received from a server system 220.

Users may interact with various client systems 202 to provide input and receive information. For instance, as illustrated, users 204-1 and 204-N may interact with client systems 202-1 and 202-N by utilizing the operating system and/or various applications executing on the client systems 202-1 and 202-N.

In some embodiments, a client application (e.g., a client application executing on a client system 202, the third-party application 222, etc.) may send a request (also referred to as an object storage request) to the server system 220 to store, update, delete, or retrieve a particular file stored at the server system 220-N through the communication network 210. For example, a user may update a document using a word processing application and may save the updated version to the server system 220-N, in which case the word processing application transmit a request to the storage application 224 to store the updates.

The object storage request may include information describing the object being updated, such as a file name, the data comprising the updates, a client identifier, an operation type, etc., and the storage application 224 may use that information to record the updates, as described herein. In another example, a client application (e.g., an application executing on a client system 202, the third-party application 222, etc.) may request an object or portion thereof, a list of objects matching certain criteria, etc., in which case the request may include corresponding information (e.g., an object identifier, search criteria (e.g., time/date, keywords, etc.), and receive an object list or the object itself from the storage application 224. Numerous other use cases are also applicable and contemplated.

As shown in FIG. 2, the server system 220-N may include a storage application 224 and may be coupled to and/or include a key data store 230. The storage application 224 may include components that perform various tasks, as discussed with reference to at least FIG. 3. The storage applications 224, and/or its components, may be coupled for communication to one another and other components of the system, such as the key data store 230, the object storage 240, an application executing on a client system 202, the third-party application 222, etc.

The storage application 224 may provide an object storage service, manage data storage using the key data store 230 and the object storage 240 (e.g., store, retrieve, and/or other manipulate data in the key data store 230, retrieve data objects from the object storage 240, etc.), process requests received from various entities (e.g., client systems 202, server systems 220, local application, etc.), provide for lock-free concurrency, perform garbage collection, and perform other acts, as discussed further herein. The storage application 224 may include various interfaces, such software and/or hardware interfaces (e.g., application programming interface(s) (API(s)), that may be accessed (e.g., locally, remotely, etc.) by components of the system 200, such as various client applications, the third-party application 222, etc.

In some embodiments, the storage application 224 may be a distributed application that is implemented in two or more computing systems. In some embodiments, the object storage 240 may comprise a plurality of storage devices, servers, software applications, and other components, such as but not limited to any suitable enterprise data grade storage hardware and software. Similarly, while FIG. 2 shows the key data store 230 as residing on a single server, it should be understood that the key data store 230 may be distributed across two or more computing systems, such as server systems 220. In some embodiments, the storage application 224 may be a local application receiving local and/or remote storage requests from other clients (e.g., local applications, remote applications, etc.).

The key data store 230 may comprise a database that stores an ordered set of object key entries, as discussed in further detail elsewhere herein. In some embodiments, the key data store 230 may comprise a horizontally partitioned database having two or more shards 232-1 . . . 232-N, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Thus, depending on the configuration, database shards may be implemented on different physical storage devices, as virtual partitions on the same physical storage device, or as any combination thereof.

The server system 220-N may be coupled to and/or include an object storage 240. The object storage 240 comprises one or more data stores for storing data objects. The object storage 240 may implemented across a plurality of physical storage devices. In some example embodiments, the plurality of physical storage devices may be located at disparate locations. Objects stored in the object storage 240 may be referenced by object key entries stored in the key data store 230. In some example embodiments, multiple copies of a given object or portions thereof (e.g., erasure-encoded copies) can be stored at different physical storage devices to protect against data loss through system failure or to have the object quickly accessible from different geographic locations.

The key data store 230 and/or the object storage 240 may be included in the server system 220-N or in another computing system and/or storage system distinct from but coupled to or accessible by the server system 220-N. The key data store 230 and/or the object storage 240 include one or more non-transitory computer-readable mediums (e.g., such as those discussed with reference to the memor(ies) 304 in FIG. 3) for storing the data. In some implementations, the key data store 230 and/or the object storage 240 may be incorporated with the memor(ies) 304 or may be distinct therefrom. In some implementations, key data store 230 and/or the object storage 240 may store data associated with a database management system (DBMS), such as one comprised by and/or controlled by the storage application 224 (e.g., the key data store controller 320, the storage service 322, etc., see FIG. 3) and/or other components of the system 200. In some instances, the DBMS may store data in multi-dimensional tables comprised of rows and columns, and manipulate, e.g., insert, query, update and/or delete, rows of data using programmatic operations, although other suitable DBMS configurations are also applicable.

It should be understood that the system 200 illustrated in FIG. 2 is representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the system 200 may be integrated into a single computing device or system or additional computing devices or systems, etc.

Figure 3:
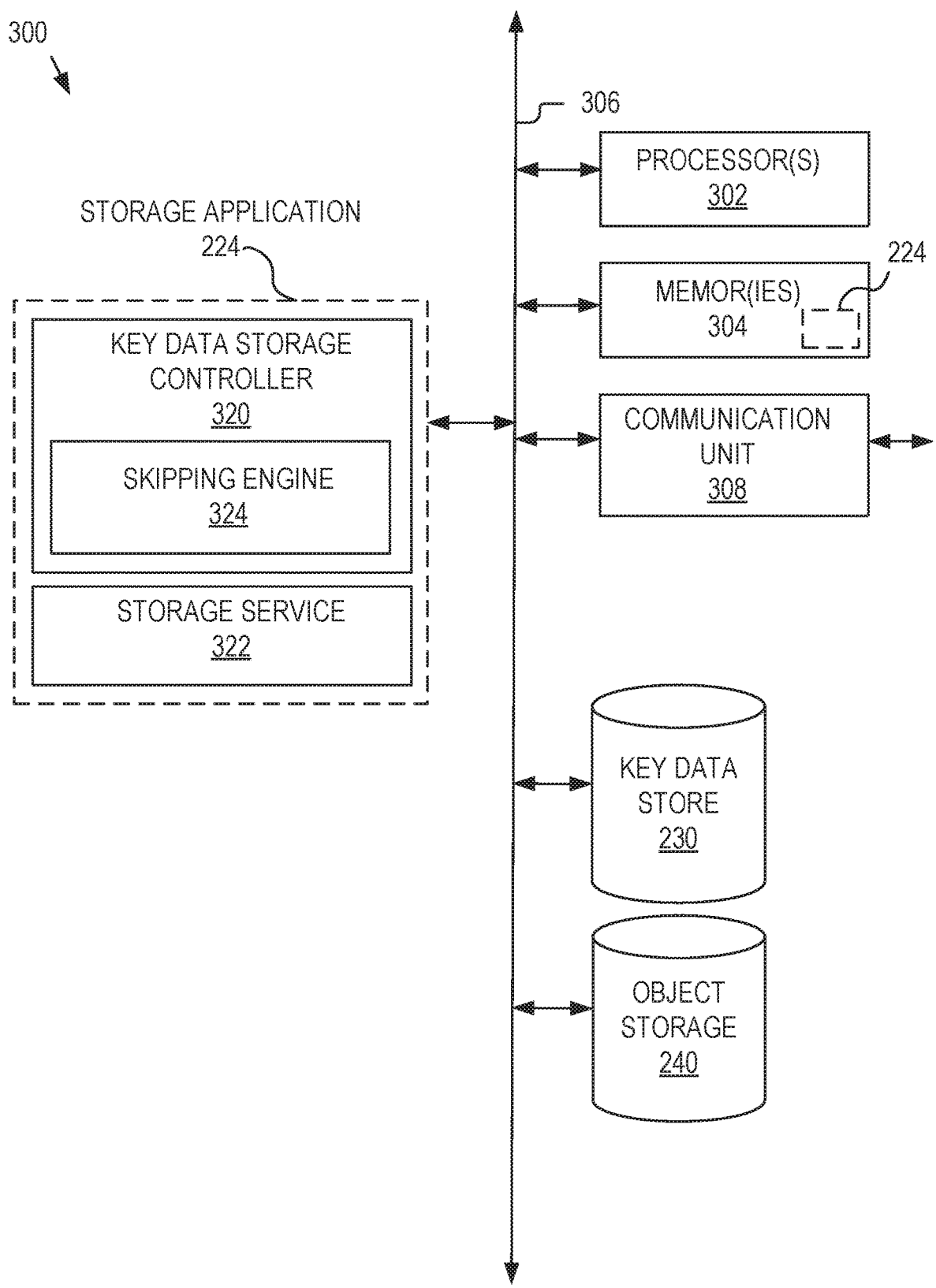
FIG. 3 is a block diagram of an example computing system.

FIG. 3 is a block diagram of an example computing system 300. In some embodiments, the computing system 300 may represent a server instance or collection of instances, such as the server system 220-N. In some embodiments, the computing system 300 may represent other computing systems, such as a client system 202, a dedicated storage system, etc. The computing system 300 may comprise and/or be coupled to one or more processors 302, one or more memories 304, one or more communication units 308, a key data store 230, and an object storage 240. The computing system 300 further includes an instance of the storage application 224. The components of the computing system 300 can be communicatively coupled by a bus 306. In some embodiments, the key data store 230 and/or the object storage 240 may be implemented in a separate computing system and may be coupled to the computing system 300 via the communication unit 308. In such embodiments, the storage application 224, or aspects thereof, may be implemented in the separate computing system (e.g., as a distributed or local application, etc.).

As shown in FIG. 3, the storage application 224 includes a key data store controller 320 and storage service 322, although it should be understood that the depicted storage application 224 architecture is provided by way of illustration, and that the storage application 224 may include other components and/or include other component hierarchies, and/or that the foregoing components and/or their acts and/or functionality may be combined or segmented into further components, etc.

The storage application 224, and/or its sub-components, such as, but not limited to, the key data storage controller 320, the skipping engine 324, and/or the storage service 322 may be implemented in hardware and/or software. For instance, the storage application 224, and/or one or more of its sub-components, may include hardware and/or software logic executable by the computing system 300. In some embodiments, the storage application 224, and/or one or more of its sub-components, may comprise sets of instructions executable by the processor(s) 302 to provide their functionality. In some embodiments, the storage application 224, and/or one or more of its sub-components, are stored in the memor(ies) 304 of the computing system 300 and are accessible and executable by the processor(s) 302 to provide their functionality. In any of the foregoing implementations, the storage application 224, and/or one or more of its sub-components, may be adapted for cooperation and communication with the processor(s) 302 and other components of the computing system 300.

In further implementations, the storage application 224, and/or one or more of its sub-components, may include specially configured software stored in the memor(ies) 304 and executable by the processor(s) 302 to configure the processor(s) 302. In some embodiments, the storage application 224, and/or one or more of its sub-components, may include logic gates, switches, application specific integrated circuitry (ASIC), a programmable logic controller, an embedded microcontroller, and/or other suitable hardware, etc. In further embodiments, the storage application 224, and/or one or more of its sub-components, may include both hardware and software aspects. Numerous further variations are also possible and contemplated.

It should be appreciated that computing system 300 may represent a single computing system, a plurality of computing systems connected over a wide geographic area, a server cluster, or other suitable computing configurations. Thus, while the structure, acts, and functionality of computing system 300 may be described in the singular for clarity, it should be understood that the description is applicable to and includes more simple or complex computing infrastructure.

The key data store controller 320 comprises logic executable to manage the key data store 230. For instance, the key data store controller 320 maintains the integrity of the ordered set of object key entries, generates new object keys, stores new entries, retrieves existing entries, and manages concurrency, manages garbage collection, etc.

The key data store controller 320 can maintain the entries stored in the key data store 230 as an ordered set of object key entries. As discussed elsewhere herein, such as with reference to FIGS. 1A-1C, the ordered set of object key entries may first group the entries using at least an object identifier component of the key, and then group the entries corresponding to each name in order of most-recent to least recent using an inverse time component of each of the keys. Additionally, entries may further be grouped in the ordered set of object key entries using further key components, such as one or more additional prefixes preceding the object name/identifier. One or more suffixes following the inverse timestamp component may be used to determine characteristics about the operation represented by the entry and/or further distinguish the key from other keys, for instance based on the application or device that executed the operation (e.g., client ID), the type of operation that was performed, and so forth.

In some example embodiments, keys may comprise alphanumeric character strings that include letters, numbers, and/or symbols (character symbols, punctuation, mathematical symbols, etc.), in which case the ordered set of object key entries may be sorted alphanumerically. For instance, referring to FIG. 1C, key 132-1 is first because the inverse timestamp of 80 comprising a portion of the character string of that key is lower than the inverse timestamp of 90 comprising a portion of the character string of the subsequent key of entry 132-2. However, it should be understood that configurations that reverse the sorting order and the inverse timestamps to achieve an objective equivalent to that as the ordered set of object key entries are encompassed hereby. Further, the keys may comprise other suitable constructs (e.g., encoded, compressed, etc.) that can be sorted in an analogous manner.

The key data store controller 320 stores entries in the key data store 230 representing data manipulation operations performed on objects (e.g., read, modify, write, etc.). Entries may be stored responsive to object storage requests received by the storage service 322, such as but not limited to, put, get, delete, list, etc. The storage service 322 may be coupled to the key data store controller 320 to instruct the key data store controller 320 to record the data manipulation operations. For example and not limitation, in a software embodiment, the storage service 322 can call corresponding methods of the key data store controller 320 configured to perform the various functions and acts described herein. An instruction received form the storage service 322 may comprise a new key entry request that includes components for generating the key, and in some embodiments, data corresponding to the key.

By way of example, when recording a write, update, delete, etc., operations, the key entry request received from the storage service 322 may include key-related data for generating the key, and a corresponding data instance (e.g., data value) for storage in association with the key. Responsive to receiving the storage instruction from the storage service 322, the key data store controller 320 computes an inverse timestamp using the key-related data, generates the key using the inverse timestamp, the object identifier, etc. (e.g., a prefix, an operation type, etc.), and stores a new entry comprising the generated key and the data instance in order of recency, as described elsewhere herein.

Continuing the foregoing example, the key data store controller 320 can determine the inverse timestamp using an operation timestamp and a reference timestamp by determining a difference between the operation timestamp and the reference timestamp (e.g., subtracting the operation timestamp from the reference timestamp), as discussed elsewhere herein. The operation timestamp may be included in the instruction data or may be determined by the key data store controller 320 (e.g., using a clock of the local system, issuing a call to the operating system, etc.). For instance, the object storage request received and processed by the storage service 322 includes a timestamp determined by the requesting computing system upon which the request was initiated (e.g., a client system 202, server system 220-1, etc.). In this case, the local operation timestamp may reflect the point in time in which the object storage operation was initiated (e.g., based on a clock of that system). In another example, the key data store controller 320 assigns a timestamp to a requested object storage request based on the clock at the server system 220. Other suitable variations may also apply.

In the foregoing example, the new entry is situated first for that object (relative to other existing entries) in the ordered set of object key entries since it is the most recent based on the inverse timestamp. However, as further operations are performed on the object, as discussed elsewhere herein, corresponding further entries are added to the key data store 230 and the foregoing new entry becomes less recent. This advantageously allows for scalable and flexible versioning of a data object.

An operation type component included in the key generated by the key data store controller 320 may represent the operation performed on the object, and may be used to record the lifecycle of the object over time (when it was initially created, modified, deleted, etc.).

As another example, when performing a read operation (e.g., responsive to receipt of a list request), the instruction data received from the storage service 322 may include key-related search terms that are used for querying the key data store 230. For example, the search term(s) may comprise an object identifier or portion thereof, and the key data store controller 320 may query the ordered set of object key entries in key data store 230 based on it and return a corresponding result set. Additional or alternative search term(s) may include, but are not limited to, data describing a domain, bucket, timestamp, operation type, etc., and the key data store controller 320 may query the ordered set of object key entries in the key data store 230 based on them and return a corresponding result set.

In some cases, the result set may be ordered in inverse order beginning with the most-recent entry first and the oldest entry last, which mirrors the order in the ordered set of object key entries of the key data store 230, although the result set could be ordered in other ways depending on implementation.

In some embodiments, further key components may be included in the instruction from the storage service 322 so the result set may be refined (e.g., limited to a certain client and/or operation type, etc.). In some cases, the most-recent entry for a particular object representing the most-recent data manipulation operation may be requested, in which case the result set may include a single result. Other variations are also possible and contemplated.

Advantageously, the key data storage controller 320 can manage recording concurrent data storage-related operations for the same object without having to lock the key data store 230.

As shown in FIG. 3, the key data store controller 320 may include a skipping engine 324. The skipping engine 324 may allow the storage service 322 to efficiently traverse the key data store, generate result sets (e.g., lists) that include select key entries, and/or identify key entries suitable for garbage collection.

To facilitate efficient traversal and processing of key entries in the key data store 230, the data stored may be conceptually represented as a tree structure, in which the levels are respectively defined by the prefix, data object identifier and suffix of the keys. Using this conceptualization, efficient retrieval algorithms, such as for example B-trees or similar, may be used without requiring an explicit tree structure feature to be implemented in the key data store 230 itself.

In some example embodiments, an ordered list of data objects may be requested as a result set. In some cases, ordered lists can enable and/or be used for various functionality, such as, but not limited to, pagination through an ordered list of data objects or metadata of the same.

Figure 5:
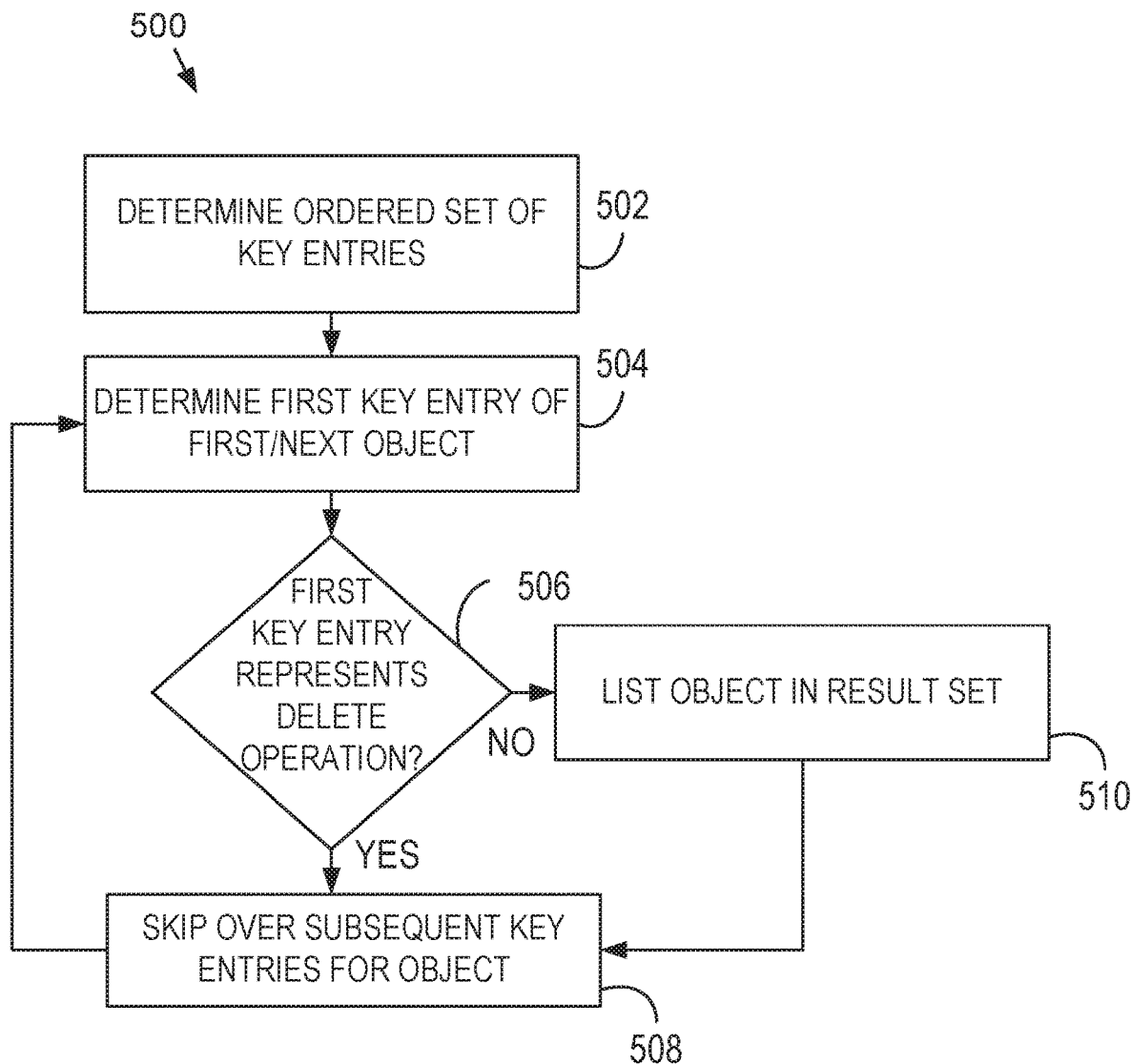
FIG. 5 is an example method for traversing key entries and generating a result set.
Figure 6:
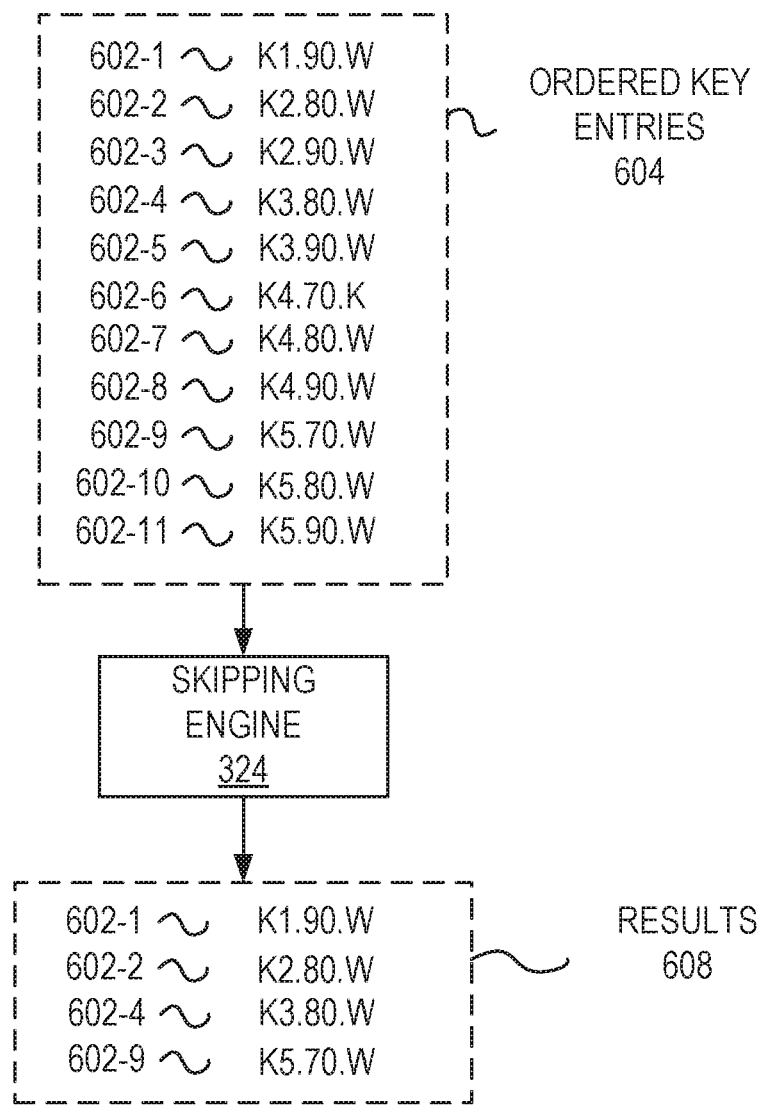
FIG. 6 is a diagram illustrating traversal of example key entries to generate a result set.

In some example embodiments, the skipping engine 324 may use a depth-first skip strategy to search and identify relevant entries, and generate a result set of key entries in the key data store 230, as described in further detail with respect to at least FIGS. 5 and 6. For example but not limitation, the skipping engine 324 identifies the first key entry from the key data store, where first indicates the key entries position in the key data store relative to a given object. For instance, the first key entry identifies the object, and is the first key entry (sequentially) associated with that object in the key data store (with other possible key entries coming after it).

Responsive to identifying the first key entry for the object, the skipping engine 324 may then include information associated with the key entry in the result set. For example, the skipping engine 324 may add a key from the first key entry, add an object identifier identifying the object, or other available information, to the result set.

In some embodiments, the skipping engine 324 includes the information associated with the key entry in the result set responsive to one or more criteria being satisfied, such as one or more dimensions included in the key of the first key entry meeting one or more predefined parameters. For example, if the key of the key entry includes an operation type dimension representing a delete operation (e.g., delete, kill, etc., operation represented as "K"), then the skipping engine 324 may forgo adding information associated with the key entry in the result set, whereas if the operation type dimension represents an operation other than the delete operation, may add information associated with the key entry in the result set. Other variations are also possible and contemplated. This advantageously result in key entry-related information being retrieved in an efficient and scalable way from the key data store 230. Additionally or alternatively, the skipping engine 324 may skip any subsequent key entries that are associated with the object.

The skipping engine 324 may process the keys for any number of objects in the key data store and populate the result set using the depth-first skip strategy. In some embodiments, the key entries for all objects in the key data store, while in further embodiments, the key entries of a portion of objects in the key data store are processed (e.g., based on desired criteria).

The depth-first skip strategy may advantageously reduce the number of key entries and related data that are retrieved from the key data store 230, and/or exchanged with other entities (e.g., the storage service 322, a local or remote client, etc.) in response to receiving a corresponding request, a timer, etc. In this way bandwidth consumption and memory requirements can be reduced.

The skipping engine 324 may, in some embodiments, use a breadth-first traversal strategy to retrieve and provide a result set (e.g., an ordered list) comprising select or all previous versions for each data object. This can be valuable for efficiently determining which versions of an object to garbage collect, for example, or for listing prior versions of objects that can be accessed, etc. As a further example, the storage service 322 and/or key data store controller may use the information in the result set to perform garbage collection of the corresponding object versions. In some embodiments, under the breadth-first traversal strategy, the skipping engine 324 may traverse the entries as virtual tree by processing the child nodes beginning at the lowest level of the tree and working up based on traversal parameters (e.g., based on a specific request), as described in further detail with respect to at least FIG. 4.

Figure 7:
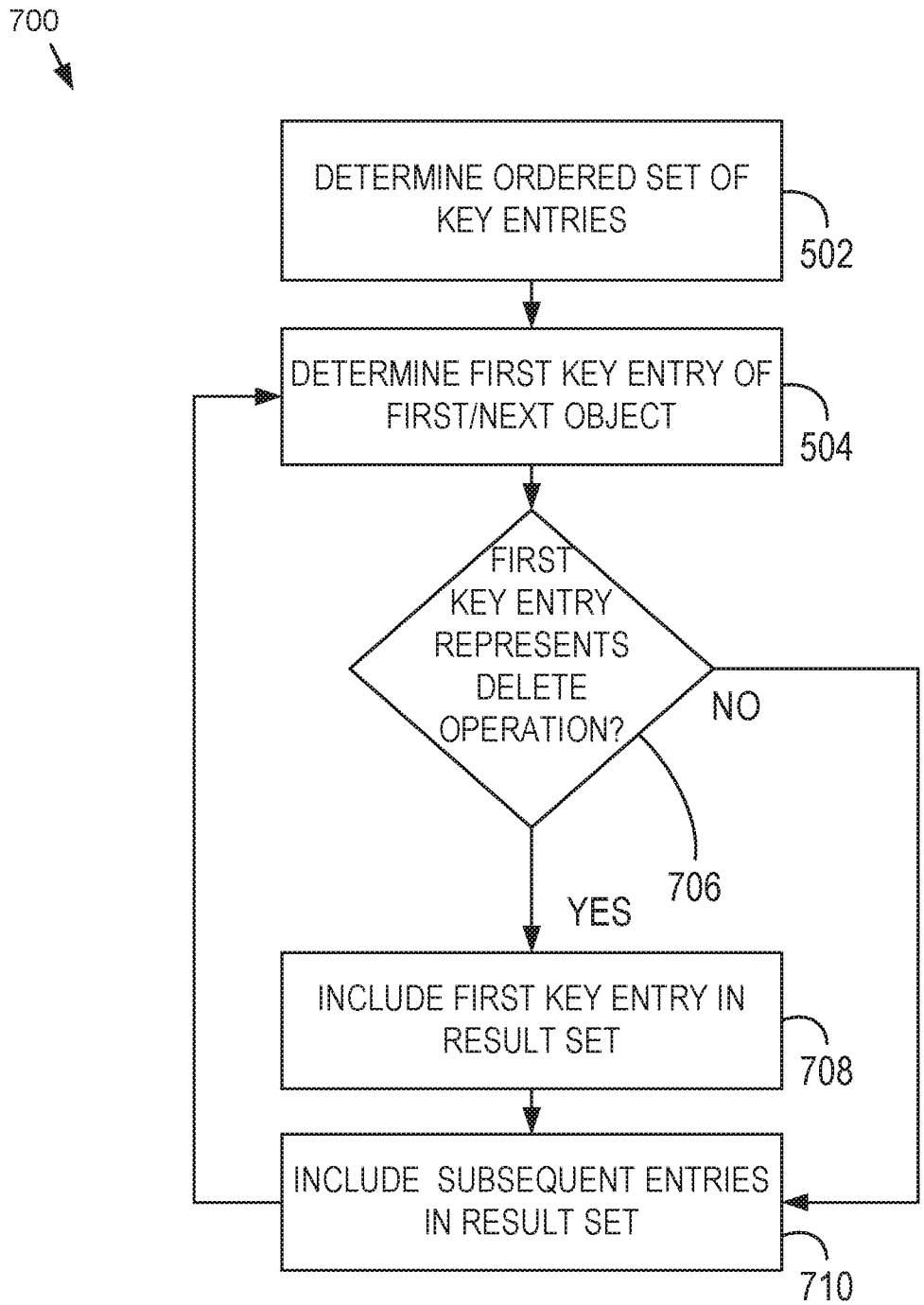
FIG. 7 is a flowchart of an example method for generating a result set of obsolete key entries.
Figure 8:
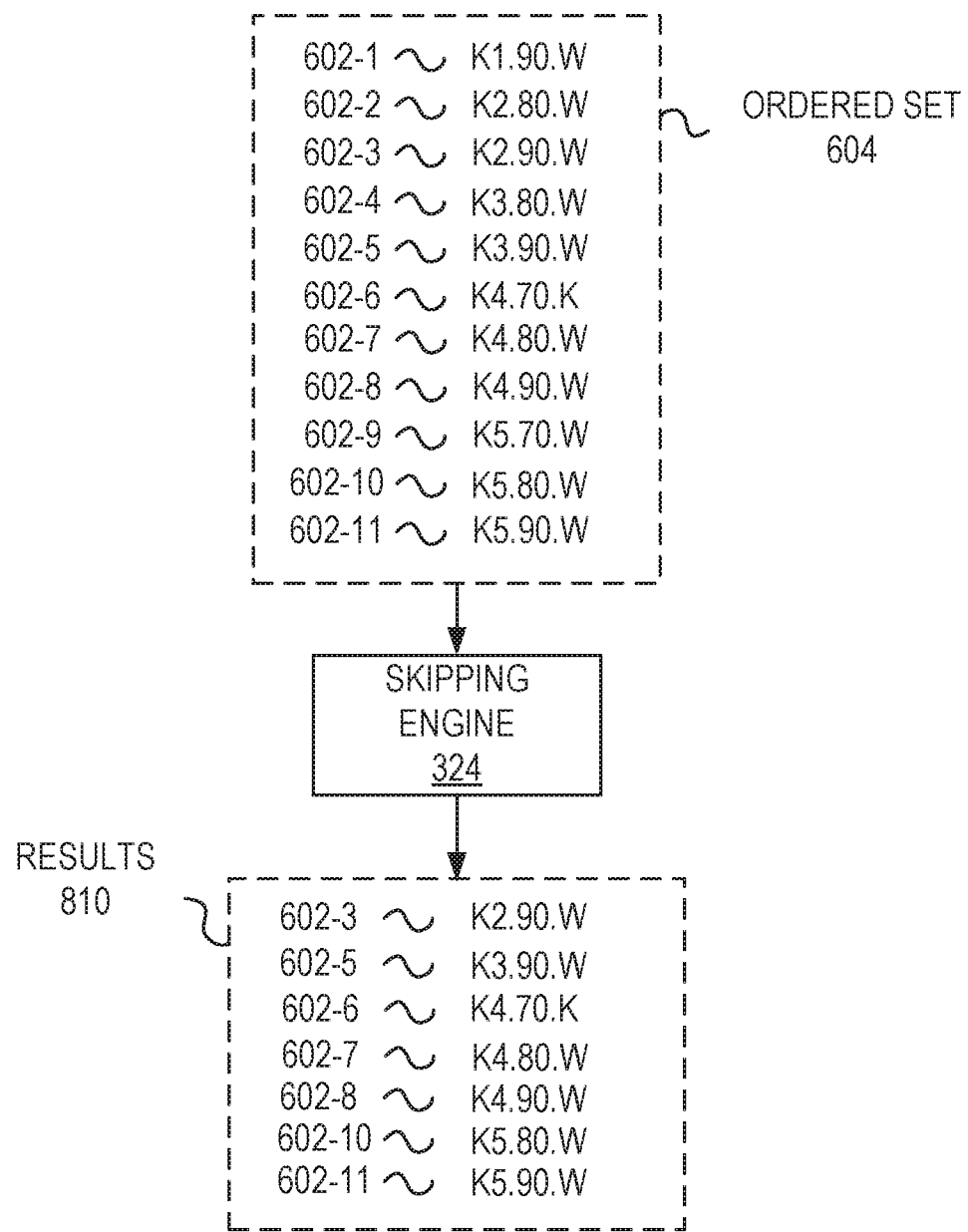
FIG. 8 illustrating traversal of example key entries to generate a result set of obsolete key entries.

The skipping engine 324 may, in some embodiments, use a garbage-first strategy to retrieve and provide a result set (e.g., an ordered list) comprising outdated or deleted versions of data objects, as discussed in further detail with respect to at least FIGS. 7 and 8. A request for an ordered list comprising outdated or deleted objects can advantageously be used in the context of garbage collection, for review and deletion of the objects by a client, etc.

The storage service 322 comprises computer logic executable to process object storage requests. The storage service 322 may receive requests from local applications and/or remote applications. An application that sends storage requests to the storage application 224 is referred to herein as a client application. The storage service 322 can process the requests and transmit corresponding responses, which may include confirmation data confirming a successful execution of a storage-related operation, response data including results of a query-based request, and/or error information indicating any errors that were encountered, etc. In further embodiments, the functionality of the storage service 322 may be included in the key data store controller 320, in which case the key data store controller 320 may receive and process the object storage requests.

In some embodiments, the storage service 322 may include a request handler that receives and parses object storage requests from client applications, such as a client application operating on various client systems 202, server systems 220, etc. As discussed elsewhere herein, the request may include any data necessary for executing the request, such as data for generating a new object key entry (e.g., key components, data value (e.g., an address, such as a link, pointer, reference, unique identifier, etc.)), data for querying entries based on the key (e.g., search terms, key components, etc.), object data to be stored in the object storage 240 (e.g., comprising a new object, modification to the object, object metadata describing the object, updates, etc.), data for performing garbage collection of objects managed by it, etc. The storage service 322 may parse the data from the request and process it accordingly.

For example, responsive to receiving a request, the storage service 322 may implement the requested object storage operations in the object storage 240. For example, the storage service 322 may read, write, update, and/or otherwise manipulate objects in the object storage 240 based on parameters of the request. For instance, if the request is a write request that stores a new object to the object storage 240, the storage service 322 may write the new object to the object storage 240. If the request is a delete or garbage collection request, the storage service 322 may delete the object(s) from object storage 240.

The storage service 322 may interact with the key data storage controller 320 to store and retrieve data from the key data store 230. To do so, in some cases, the storage service 322 can issue various instructions to the key data storage controller 320, such as but not limited to instructions comprising put, get, delete, list, request, etc.

In some embodiments, in conjunction with the implementation of an object storage operation, the storage service 322 may request that the key data storage controller 320 store a new entry indicating the operation responsive to receiving the object storage request from a client. As discussed elsewhere herein, each ticket/entry stored in the key data store 230 may be associated with an object storage operation performed at a particular point in time in association with an object in the object storage 240.

By way of further example and not limitation, the storage service 322 may request that the key data storage controller 320 store an entry in the key data store 230 that corresponds with an operation being performed on a corresponding object in the object storage 240. For instance, in association with writing a new object to the object storage 240, the storage service 322 may request that the key data storage controller 320 store a new entry comprising a corresponding object key (that includes the object identifier, inverse timestamp, etc.) and object reference in the key data store 230. Alternatively, when an object is deleted from the object storage 240, the storage service 322 can request that the key data storage controller 320 store an entry in the key data store 230 representing deletion of that object, as discussed elsewhere herein. In association with that instruction, the storage service 322 may or may not delete some or all instances of the object data from the object storage 240 depending on the data retention protocol or garbage collection policies.

In some embodiments, the storage service may instruct the key data storage controller 320 to query the key data store 230 for one or more entries matching query criteria included in the request. For instance, responsive to receiving the request, the key data storage controller 320 may query the operations associated with a particular object by querying the key data store 230 for the ordered keys associated with the object (e.g., using the object identifier, etc.), and return a result set to the storage service 322 for provision to the requester.

The storage service 322 may be coupled to the key data storage controller 320 and/or the skipping engine 324, and interact with the key data storage controller 320 and/or skipping engine 324, to store and retrieve data from the key data store 230. The storage service 322 may be coupled to the key data storage controller 320 and/or the skipping engine 324, and interact with the key data storage controller 320 and/or the skipping engine 324 to store and retrieve data from the key data store 230.

In some embodiments, the storage service 322 may allocate space in the object storage 240 to store immutable objects. The storage service 322 may also determine and provide (e.g., to the key data storage controller 320) a link or pointer to the location of the object for use in an object key associated with the object. Similarly, if a particular object or version of an object is requested by a client system (e.g., client system 202 in FIG. 2), the storage service 322 may determine where the object is stored in the object storage 240, retrieve it, and transmit it.

Figure 4:
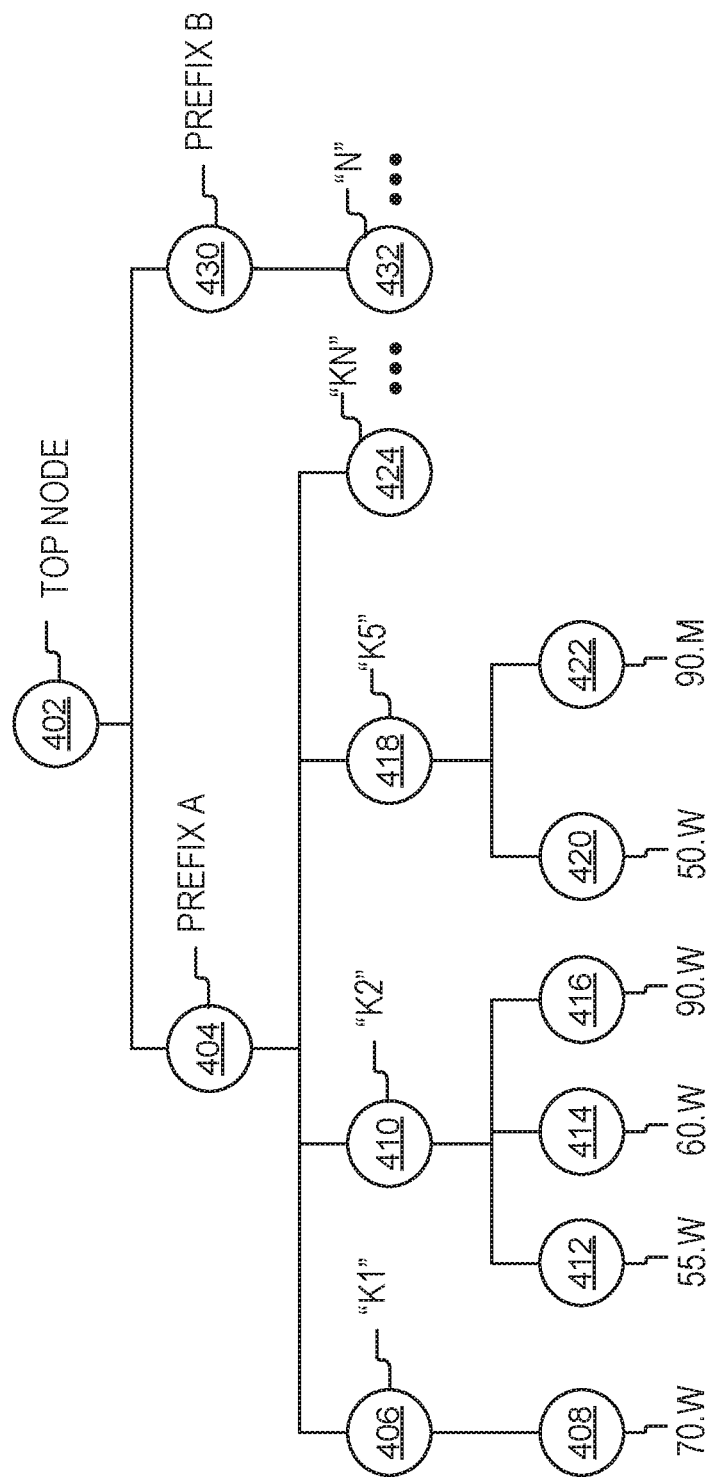
FIG. 4 is a diagram of an example data tree structure resembling data stored in a key data store.

FIG. 4 is non-limiting example of a key entry storage system represented in a tree structure comprising hierarchical nodes. In the depicted node tree, the top node 402 may represent the ordered database of key entries. The top node 402 may have a plurality of child nodes (404 and 430). A child node of the top node 404 may represent a particular prefix component of key entries stored in the key data store 230. As noted above, the ordering of key entries may result in the key entries with the same prefix being grouped together. For example, the prefix may include various dimensions, such as a domain identifier, a bucket identifier, a client identifier, and/or any suitable combination thereof. A prefix may provide a useful grouping of key entries. For example, a given client's key entries may be grouped together.

Each prefix component node (404 and 430) may have one or more child nodes. In this example, the child nodes of prefix component nodes may be nodes representing particular objects (406, 410, 418, 424, and 432, representing objects "K1", "K2", "K3", "KN", and "N" respectively). In some example embodiments, an object node has one or more child nodes. These child nodes represent suffixes for one or more requested operations (e.g., 408, 412, 414, 416, 420, and 422). In some example embodiments, the suffixes may include an inverse timestamp and an operation type indicator. In this example, for example, node 408 has an inverse timestamp of 70 and an operation type of W (representing a write operation).

Tree-based algorithms may be used by the server system 220, a third-party application 222, a client 204, etc., for efficiently traversing key entries. For example, if searching for an up-to-date version of a particular object (or a list of up-to-date key entries), a depth-first strategy may be used.

By way of example and not limitation, a depth-first strategy may be used in conjunction with a skip strategy to traverse the tree at one level above the lowest level (object nodes) and make use of the first child at the lowest level for the ordered list (unless it comprises a delete/kill type). In another example, a breadth-first may be used to retrieve an ordered list comprising a list of previous or outdated versions of a data object. The breadth-first search strategy may, in some cases, traverse the tree at the lowest level and make use of the child nodes at the lowest level instead of only the first child node.

FIG. 5 is an example method 500 for traversing key entries and generating a result set, and FIG. 6 illustrates the traversal of example key entries to generate a result set according to the method 500 of FIG. 5.

In block 502 of FIG. 5, the skipping engine 324 may determine an ordered set of key entries 502. In some embodiments, the ordered set of key entries is stored in the key data store, and the skipping engine 324, using methods surfaced by the key data store controller 320, iterates through the key entries by invoking corresponding commands. In some embodiments, the skipping engine 324 may request the key data store controller 320 return a list of the entries from the key data store. For example, the list may include keys and/or object-related information corresponding to the entries in the key data store, although any suitable information may be returned. The skipping engine 324 may iterate through the list to process the listed information as described herein.

In a usual case where the key data store stores information about numerous objects, the skipping engine 324 may use the method to iterate through the ordered key entries of some of all of those objects. In block 504, the skipping engine 324 may determining a first key entry for an object in the ordered set of key entries. The object may be the first object encountered in the key data store, as is the case when the method begins, or the next object in sequence, such as when the method returns from block 508 to block 504.

More than one key entry may be stored for a given object in the key data store. As discussed elsewhere herein, the key entries may represent different data storage operations that are performed in association with the data object over time, including operations that version the object. In some embodiments, the most recent key entries representing write operations represent the most recent versions of the data object, and the least recent key entries representing write operations represent the least recent versions (e.g., older versions or out-of-date versions) of the data object. In these embodiments, the first key entry for the object, which is positioned ahead of the other key entries (e.g., based on the inverse timestamp included in the key) can be considered to represent most recent, up-to-date version of the data object.

To further illustrate, in the example of FIG. 6, if the object determined in block 504 is the (first) object, K1, then the first (and only) key entry for K1 is 602-1. If the object determined in block 504 is the next (second) object, i.e., K2, then the first key entry for K2 is 602-2. Unlike K1, the ordered set of key entries 604 includes more than one key entry for K2, so 602-2 is the first key entries since it is ordered ahead of 602-3.

In block 506, the skipping engine 324 determines the object storage operation represented by the key of the key entry determined in block 504 and then determines whether the object storage operation represented by the key of the key entry comprises a delete operation.

Responsive to determining that the object storage operation represented by the key of the key entry comprises a delete operation, the skipping engine 324 skips over subsequent key entries associated with the object in the ordered set of key entries as reflected in block 508.

On the other hand, responsive to determining that the object storage operation indicated by the key of the second key entry comprises an operation other than the delete operation (e.g., is a write operation, read operation, or another operation), the skipping engine 324 lists the object in the result set. In some cases, listing the object may comprise including the key, object, object identifier, or other object-related or key-related information in the result set.

The skipping engine 324 then proceeds to process the next object in the ordered set of key entries by returning to block 504. The method may repeat the operations 504-510 as needed to carry out the functionality desired. In some cases, that may involve processing all of the entries or select entries from the key data store.

Referring again to FIG. 6 for further illustration, when evaluating object K1, the skipping engine 324 determines whether the key entry represents a delete operation. More particularly, the skipping engine 324 processes the key from the key entry 602-1, which is "K1.90.W" by parsing the operation type dimension (the "W") from the key and determining that the entry represents a write operation based on the operation type dimension having a value of "W". As such, the skipping engine 324 determines that key entry 602-1 does not represent a delete operation, and adds object K1 to the result set (e.g., adds key entry, key, object identifying information, etc. to the result set 608).

The skipping engine 324 processes the key entries for the next object, K2, in the ordered set of key entries 604. As shown, the ordered set of key entries 604 includes two key entries, 602-2 and 602-3, for K2. The skipping engine 324 evaluates the first key entry, 602-2, to determine if the key entry represents a delete operation. The key of key entry 602-2, which is "K2.80.W", represents a write operation, so like with K1, the skipping engine 324 adds object K2 to the result set 608 (e.g., adds key entry, key, object identifying information, etc. to the result set 608). The skipping engine 324 then skips over key entry 602-3 and proceeds to serially process the key entries 602-4 to 602-11 for objects K3-K5 using the operations of method 500.

The key entries 602-6 to 602-8 represent an example where the first key entry represents a delete operation. In particular, the skipping engine 324 determines that the first key entry for the object K4 represents a delete operation, and responsive thereto, the skipping engine 324 skips adding information for the object K4 to the result set. In particular, the skipping engine 324 skips over key entries 602-6, 602-7, and 608-8, because the most recent entry for K4 indicates that it has been deleted, so both that entry, and the less recent entries for K4 are omitted from the result set, which represents a list of up-to-date versions of active objects.

After processing, the result set 608 includes information describing objects K1, K2, K3, and K5 (e.g., include key entries 602-1, 602-2, 602-4, and 602-9, information therefrom, object information associated wherewith, etc.) because their first key entries did not indicate that they had been deleted.

FIG. 7 is a flowchart of an example method 700 for generating a result set of obsolete key entries, and FIG. 8 illustrates the traversal of example key entries to generate a result set of obsolete key entries according to the method 700. In the method 700, the blocks 502 and 504 are substantially similar to or the same as those described above with respect to FIGS. 5 and 6, so their description will not be repeated here for the purposes of brevity.

In block 706, the skipping engine 324 determines the object storage operation represented by the key of the key entry determined in block 504, and then determines whether the object storage operation represented by the key of the key entry comprises a delete operation.

Responsive to determining that the object storage operation represented by the key of the key entry comprises a delete operation, the skipping engine 324 includes information associated with the first key entry in result set in block 708, such as the key, information from the key entry, information from the key entry, an object identifier, object data, or other object or key-related information.

On the other hand, responsive to determining that the object storage operation represented by the key of the second key entry comprises an operation other than the delete operation (e.g., is a write operation, read operation, or another operation), the skipping engine 324 skips adding information related to the first key entry to the result set.

In block 710, responsive to including or skipping information related to the first key entry as reflected above, the skipping engine 324 including information associated with subsequent key entries associated with the object in the result set, and then returns to process the next object, terminations, or proceeds to perform other operations.

Referring to FIG. 8, the skipping engine 324 accesses and evaluates key entry 602-1, and determines that the operation type "W" included in the key of key entry 802-1 is not a delete operation. Responsive thereto, the skipping engine 324 skips listing the first key entry in the result set 810. Since there is no subsequent key entry for object K1, the skipping engine 324 does not identify any, and proceeds to evaluate the key entries 602-2 and 602-3 for the next object, K2.

The skipping engine 324 determines that the operation type associated with key entry 602-2, the first entry, is also not a delete operation. The skipping engine 324 skips adding the first entry to the result set 810, but does adds subsequent key entries (602-3) to the result, which represent older operations performed in associate with the object K2. It should be understood that the skipping engine 324 may skip more than just the first entry. A parameter may be set that defines how many initial entries (representing operations other than delete operations) should be skipped before adding subsequent entries to the result set 810. For example, 2, 3, 4-10 or more entries may be preserved and not included in the result set 810 to provide some version control for the object (since the entries included in the result set 810 may represent obsolete entries that can be garbage collected and/or whose objects can be garbage collected).

The skipping engine 324 repeats the same process with the other objects K3-K5. With respect to object K4 in particular, as described in FIG. 6, the skipping engine 324 determines that the first key entry for the object K4 represents a delete operation. However, instead of skipping adding information for the object K4 to the result set 810, in this case, the skipping engine 324 adds the first key entry 602-6 and subsequent key entries 602-7 and 602-8 to the result set 810.

The skipping engine 324 may continue this process until each object that requires processing has been evaluated for obsolescence.

With reference to the above-described methods, one or more of the operations shown and/or described may correspond to instructions stored in a computer memory or computer-readable storage medium, a customized logic chip, or other suitable implementation as discussed elsewhere herein.

The logic described with reference to the above methods advantageously allows for efficient search and retrieval of particular key entries in a set of key entries in a distributed database system. Further, requests can be handled in a parallel way by the storage application 224, without requiring interaction with the client, thereby allowing for high performance scalability, while helping to further guarantee consistency.

To ease understanding, some elements (e.g., requests, identifiers, timestamps, operations, etc.), may be referred to in the description and/or the claims using the labels first, second, third, etc. These labels are intended in some cases to help to distinguish the elements, but do not necessarily imply any particular order or ranking unless indicated otherwise.

The processor(s) 302 may execute software instructions by performing various input/output, logical, and/or mathematical operations. The processor(s) 302 may have various computing architectures to process data signals including, for example, a complex instruction set computer (CISC) architecture, a reduced instruction set computer (RISC) architecture, and/or an architecture implementing a combination of instruction sets. The processor(s) 302 may be physical and/or virtual, and may include a single processing unit and/or core or plurality of processing units and/or cores. In some implementations, the processor(s) 302 may be capable of generating and providing electronic display signals to a display device (not shown), supporting the display of images, capturing and transmitting images, performing complex tasks including various types of feature extraction and sampling, etc. In some embodiments, the processor(s) 302 may be coupled to the memor(ies) 304 via a communication bus 306 to access data and instructions therefrom and store data therein. The communication bus 306 may couple the processor(s) to the other components of the computing system 300, for example, memor(ies) 304, communication unit(s) 308, physical storage devices and/or storage systems (e.g., object storage 240, key data store 230).

The memor(ies) 304 may store and provide access to data to the other components of the computing system 300. The memor(ies) 304 may store instructions and/or data that may be executed by the processor(s) 302. For example, the memor(ies) 304 may store an instance of the storage application 224, software implementing the key data store 230, cached keys and objects, parameters, operating system(s), drivers, databases, and/or other software applications, etc. The memor(ies) 304 may be coupled to the communication bus 306 for communication with the processor(s) 302 and the other components of computing system 300.

The memor(ies) 304 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 302. In some embodiments, the memor(ies) 304 may include one or more of volatile memory and non-volatile memory (e.g., RAM, ROM, flash, solid state drive, hard drive, optical disc, tape, magnetic diskette, etc.). It should be understood that the memor(ies) 304 may include a single device or may include multiple types of devices and configurations.

The communication unit(s) 308 may include one or more interface devices for wired and wireless communication with the communication network 210 and the other entities and/or components of the client-server key ticketing system 200 including, for example, the client systems 202, server systems 220, object storage 240, etc. For instance, the communication unit 308 may include, but is not limited to, CAT-type interfaces; wireless transceivers for sending and receiving signals using Wi-Fi™; Bluetooth®, cellular communications, etc.; USB interfaces; various combinations thereof; etc. In some embodiments, the communication unit 308 can link the processor(s) 302 to the communication network 210, which may in turn be coupled to other processing systems. The communication unit 308 can provide other connections to the communication network 210 and to other entities of the computing system 300 using various communication protocols, including, for example, those discussed elsewhere, herein. In some instances, the communication unit 308 includes a wired port and a wireless transceiver. The communication unit 308 also provides other connections to the communication network 210 for distribution of files and/or media objects using various network protocols, such as those discussed elsewhere herein.

In some embodiments, the computing system 300 may include a software communication mechanism implemented via the communication network 210 and/or communication bus 306 that can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

In the above description, for purposes of explanation, numerous specific details are set forth to provide a thorough understanding of the various aspects of different example embodiments. Any particular example embodiment may in various cases be practiced without all of the specific details and/or with variations, permutations, and combinations of the various features and elements described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

It should also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It should also be understood that the term "and/or" as used herein refers to and encompasses any and/or all possible combinations of one or more of the associated listed items. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A computer-implemented method, comprising:
    determining an ordered set of key entries in a key value store;
    determining a first key entry for a first data object in the ordered set of key entries;
    determining, based on a key of the first key entry, an object storage operation for the first data object, wherein at least a portion of the key of the first key entry represents the object storage operation;
    determining that the object storage operation represented by at least a portion of the key of the first key entry comprises a delete operation; and
    responsive to determining that the object storage operation represented by at least a portion of the key of the first key entry comprises the delete operation, skipping over subsequent key entries associated with the first data object in the ordered set of key entries.

2. The computer-implemented method of claim 1, further comprising:
    determining a second key entry for a second data object in the ordered set of key entries;
    determining, based on the key of the second key entry, a second object storage operation for the second data object, wherein at least a portion of the key of the second key entry represents the second object storage operation;
    determining that the second object storage operation represented by at least a portion of the key of the second key entry comprises an operation other than the delete operation; and
    responsive to determining that the second object storage operation represented by at least a portion of the key of the second key entry comprises an operation other than the delete operation, listing the second data object in a result set.

3. The computer-implemented method of claim 2, further comprising:
    responsive to determining that the second object storage operation represented by at least a portion of the key of the second key entry comprises an operation other than the delete operation, skipping over subsequent key entries associated with the second data object in the ordered set of key entries.

4. The computer-implemented method of claim 1, further comprising:
    storing a plurality of key entries in an ordered database of key entries at a server system, wherein:
        each key entry of the plurality of key entries is associated with a corresponding object storage operation in an object storage system associated with the server system; and
        the ordered set of key entries comprises the ordered database or a set of results queried from the ordered database.

5. The computer-implemented method of claim 1, wherein each key in each key entry in the ordered set of key entries includes a corresponding operation type identifier.

6. The computer-implemented method of claim 1, wherein the ordered set of key entries is ordered at least partially by recency.

7. The computer-implemented method of claim 1, wherein the ordered set of key entries is ordered based on one or more of an object identifier, an inverse timestamp, and an operation type.

8. The computer-implemented method of claim 1, wherein the ordered set of key entries is ordered alphanumerically by keys that include alphanumeric values for an object identifier, an inverse timestamp, and an operation type.

9. The computer-implemented method of claim 1, wherein each key entry in the ordered set of key entries has an associated key that includes an inverse timestamp.

10. A computer-implemented method, comprising:
    determining an ordered set of key entries in a key value store;
    determining a first key entry for a first data object in the ordered set of key entries;
    determining, based on a key of the first key entry, an object storage operation for the first data object, wherein at least a portion of the key of the first key entry represents the object storage operation;
    determining that the object storage operation represented by at least a portion of the key of the first key entry comprises a delete operation; and
    responsive to determining that the object storage operation represented by at least a portion of the key of the first key entry comprises the delete operation, including information associated with the first key entry in a result set.

11. The computer-implemented method of claim 10, further comprising:
    including information associated with subsequent key entries associated with the first data object in the result set.

12. The computer-implemented method of claim 10, further comprising:
    determining a second key entry for a second data object in the ordered set of key entries;
    determining, based on the key of the second key entry, a second object storage operation for the second data object, wherein at least a portion of the key of the second key entry represents the second object storage operation;
    determining that the second object storage operation represented by at least a portion of the key of the second key entry comprises an operation other than the delete operation; and
    responsive to determining that the second object storage operation represented by at least a portion of the key of the second key entry comprises an operation other than the delete operation, skipping the second key entry.

13. The computer-implemented method of claim 12, further comprising:
    including information associated with subsequent key entries associated with the second data object in the result set.

14. A computing system, comprising:
    one or more processors;
    a key data store configured to store an ordered set of key entries, wherein each key entry of the ordered set is associated with a corresponding object storage operation; and
    a storage application executable by the one or more processors to perform operations comprising:
        determining a first key entry for a first data object in the ordered set of key entries;
        determining, based on a key of the first key entry, an object storage operation for the first data object, wherein at least a portion of the key of the first key entry represents the object storage operation;
        determining that the object storage operation represented by at least a portion of the key of the first key entry comprises a delete operation; and
        responsive to determining that the object storage operation represented by at least a portion of the key of the first key entry comprises the delete operation, skipping over subsequent key entries associated with the first data object in the ordered set of key entries.

15. The computing system of claim 14, wherein the operations further comprise:
    determining a second key entry for a second data object in the ordered set of key entries;
    determining, based on the key of the second key entry, a second object storage operation for the second data object, wherein at least a portion of the key of the second key entry represents the second object storage operation;
    determining that the second object storage operation represented by at least a portion of the key of the second key entry comprises an operation other than the delete operation; and
    responsive to determining that the second object storage operation represented by at least a portion of the key of the second key entry comprises an operation other than the delete operation, listing the second data object in a result set.

16. The computing system of claim 15, wherein the operations further comprise:
    responsive to determining that the second object storage operation represented by at least a portion of the key of the second key entry comprises an operation other than the delete operation, skipping over subsequent key entries associated with the second data object in the ordered set of key entries.

17. The computing system of claim 14, wherein:
    the operations further comprise storing a plurality of key entries in an ordered database of key entries;
    each key entry of the plurality of key entries is associated with a corresponding object storage operation; and
    the ordered set of key entries comprises the ordered database or a set of results queried from the ordered database.

18. A computing system, comprising:
    one or more physical processors;
    a key data store comprising an ordered set of key entries, wherein each key entry of the ordered set is associated with a corresponding object storage operation;
    means, executable by the one or more physical processors, for determining a first key entry for a first data object in the ordered set of key entries;
    means, executable by the one or more physical processors, for determining, based on a key of the first key entry, an object storage operation for the first data object, wherein at least a portion of the key of the first key entry represents the object storage operation;

means, executable by the one or more physical processors, for determining that the object storage operation represented by at least a portion of the key of the first key entry comprises a delete operation; and means, executable by the one or more physical processors, for, responsive to determining that the object storage operation represented by at least a portion of the key of the first key entry comprises the delete operation, including the key of the first key entry in a result set.

19. The computing system of claim 18, further comprising:

means, executable by the one or more physical processors, for determining a second key entry for a second data object in the ordered set of key entries;

means, executable by the one or more physical processors, for determining, based on a key of the second key entry, a second object storage operation for the second data object, wherein at least a portion of the key of the second key entry represents the second object storage operation;

means, executable by the one or more physical processors, for determining that the second object storage operation represented by at least a portion of the key of the second key entry comprises an operation other than the delete operation; and means, executable by the one or more physical processors, for, responsive to determining that the object storage operation represented by at least a portion of the key of the second key entry comprises an operation other than the delete operation, skipping the second key entry and including information associated with subsequent key entries associated with the second object in the result set.

20. The computing system of claim 19, further comprising:

means, executable by the one or more physical processors, for garbage collecting, based on the result set, versions of the first data object and versions of the second data object.

* * * * *